United States Patent

[11] 3,626,794

| [72] | Inventor | Raymond J. Seethaler<br>2044 N. Willis Blvd., Portland, Oreg. 97217 |
|---|---|---|
| [21] | Appl. No. | 809,868 |
| [22] | Filed | Mar. 24, 1969 |
| [45] | Patented | Dec. 14, 1971 |

[54] ARBOR WITH LIVE HEAD
8 Claims, 6 Drawing Figs.

[52] U.S. Cl. .................................................. 82/38, 82/33
[51] Int. Cl. .................................................. B23b25/00, B23b 23/02
[50] Field of Search .................................... 82/33, 34, 38; 279/16

[56] References Cited
UNITED STATES PATENTS

| 1,372,577 | 3/1921 | Wallenberg | 82/33 |
| 1,993,809 | 3/1935 | Schnelle | 82/33 X |
| 2,362,812 | 11/1944 | Fouchey | 82/33 |
| 2,496,545 | 2/1950 | Kraemer | 82/33 |
| 2,555,419 | 6/1951 | Reaves et al. | 279/16 |
| 2,701,978 | 2/1955 | Lee | 82/33 |
| 3,486,404 | 12/1969 | Rigney | 82/38 |

*Primary Examiner*—Harrison L. Hinson
*Attorney*—Eugene M. Eckelman

ABSTRACT: An arbor for use on lathes or the like having a body member with a tapered rear portion adapted to be mounted in the tailstock of a lathe. The body member at its forward end has a head arranged for rotatably connecting a chuck or the like with the arbor. The rotatable connection comprises a roller or ball bearing connection. In one embodiment of the invention the front end of the body member terminates in a spindle which supports a head by bearing means. The outer surface of the head is tapered for fitting into a tapered recess of a chuck. In association with this embodiment, an adapter head may be provided which has a tapered recess for receiving the tapered head of the arbor and which may have a selected outer diameter and configuration to fit various sizes of recesses which may exist in chucks. In another embodiment of the invention, the forward end of the arbor is tapered, and the head comprises a body portion fitted on the tapered end of the arbor and having bearings on its exterior which rotatably support the chuck.

Patented Dec. 14, 1971    3,626,794

RAYMOND J. SEETHALER
INVENTOR.
BY Eugene M. Eckelman
ATTY.

3,626,794

ARBOR WITH LIVE HEAD

BACKGROUND OF THE INVENTION

This invention relates to new and useful improvements in arbors of the type arranged for use in the tailstock of lathes.

In conventional lathe construction, there is employed a headstock and a tailstock. A chuck is driven by the headstock and the workpiece at its opposite end is usually recessed at its center to operate on the point of an arbor mounted in the tailstock. In some cases it is not possible to recess the one end of the workpiece and therefore such end must be mounted within a chuck to rotate therein. In this latter case, the workpiece may have a rough surface and such surface causes damage to the jaws of the chuck.

SUMMARY OF THE INVENTION

Thus, it is a primary objective of the present invention to provide an arbor arranged to be attached to a tailstock and having a live head which rotatably supports a chuck, thus providing efficient support of the workpiece at the tailstock end of the lathe even though it cannot have a center recess for support in the usual manner. Another object is to provide a novel structure of arbor and head means to accomplish the said support of a workpiece.

Another object of the present invention is to provide an arbor of the type described adaptable for application to conventional lathes.

Another object is to provide in one embodiment an adapter head which may be providing in a number of sizes for fitting in selected sizes of mounting recesses in existing chucks.

The invention will be better understood and additional objects and advantages will become apparent from the following description which illustrates preferred forms of the device.

DETAILED DESCRIPTION OF PREFERRED EMBODIMENTS

Figure 1:
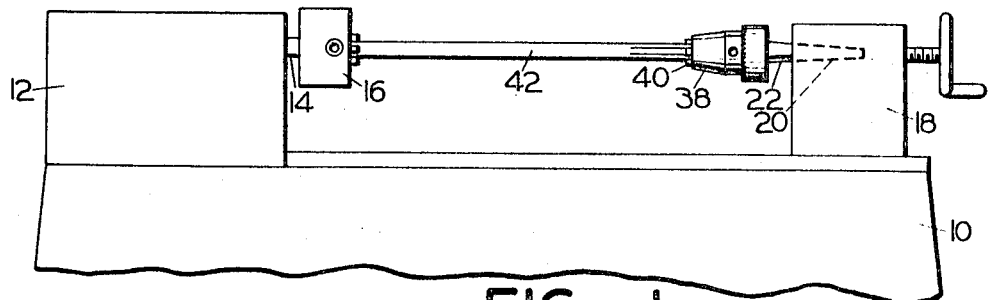
FIG. 1 is a side elevational view of a lathe illustrating the use of the present invention, this view being reduced in size relative to the other views.

Referring first to FIG. 1, the present invention is adapted for use with a lathe structure 10 including a headstock 12 having an output shaft 14 for driving a conventional chuck 16. The lathe has a tailstock 18 adjustable longitudinally of the lathe and provided with a tapered arbor-receiving socket 20.

Figure 2:
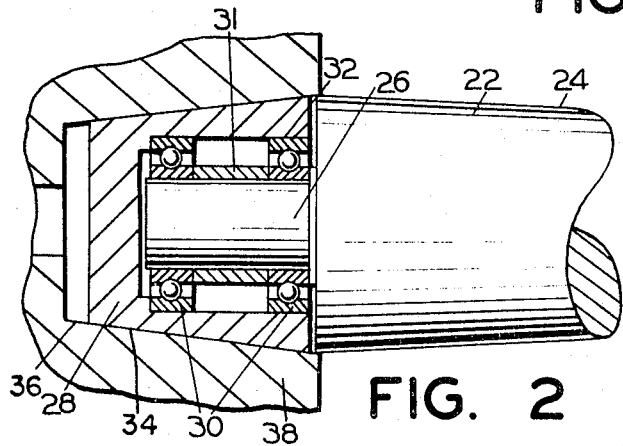
FIG. 2 is a fragmentary sectional view through a hear portion of an arbor of the present invention, this embodiment employing ball bearings for live support of the head.
Figure 3:
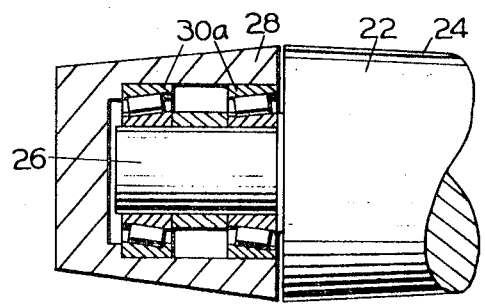
FIG. 3 is a view similar to FIG. 2 but showing an embodiment utilizing roller bearings.

According to the present invention and referring first to FIGS. 1, 2 and 3 which show a first form of the invention, there is provided an arbor 22 having a body member comprised of a rearwardly tapered end portion 24 arranged to fit in the tailstock 20. In the embodiment of FIG. 2, the arbor 22 has a front end spindle 26 reduced in diameter relative to the front end of the arbor and adapted to support a head or adapter 28 rotatably thereon by bearing means 30 preferably comprising two ball bearing assemblies one adjacent the base of the spindle and the other adjacent the outer end thereof. A spacer sleeve 31 is mounted on the spindle between the two bearings. The head 28 has an inner recess 32 opening through its rear surface for receiving the spindle and bearings. The outer surface 34 of the head 28 is tapered to a smaller dimension toward the front, the base or rearward end of the head being of substantially the same diameter as the forward end of the arbor 22.

The outer tapered surface 34 of the head 28 is adapted to be frictionally engaged in an inner tapered recess 36 of a conventional chuck 38 for connection thereto, and since the head provides bearing support for the chuck on the arbor, a live support is provided for the chuck. As is well known, such chucks have jaw means 40 at their forward ends radially adjustable for gripping the outer surface of workpieces 42. As stated hereinbefore, where workpieces 42 are rough or irregular on the tailstock end and are not capable of receiving a center notch for support on a pointed arbor, it is customary to mount the end of the workpiece rotatably in a dead chuck, whereby upon rotation of the workpiece, the jaws of the dead chuck are generally damaged to some extent. According to the applicant's invention, however, the chuck 38 rotates with the live head 28 whereby even though the arbor 22 has a stationary connection in the tailstock 18, the chuck 38 is adapted to rotate freely with the workpiece. Thus, no damage, is done to the chuck 38 or the workpiece 42.

FIG. 3 shows a second embodiment, this embodiment being identical to the structure of FIG. 2 with the exception that the bearings between the spindle 26 and the head 28 comprise roller bearings 30a instead of ball bearings.

Figure 4:
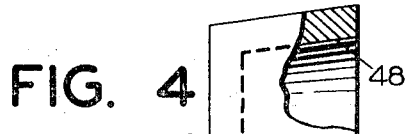
FIG. 4 is a fragmentary elevational view of an adapter head arranged for use with the embodiment of FIGS. 2 and 3.

FIG. 4 illustrates an accessory which forms a part of the present invention and is usable with the embodiments of FIGS. 2 and 3. This accessory comprises an auxiliary head or adapter 46 having a recess 48 leading inwardly from its rearward surface. Recess 48 is tapered and is adapted to receive in a frictional fit the head 28. The outer surface 50 of the auxiliary head 46 is tapered for engagement in the recess 36 of the chuck 38. By means of the embodiment shown in FIG. 4, a number of auxiliary heads 46 may be provided each of different size and/or outer surface taper for fitting corresponding sizes and tapers which may exist in the recesses 36 of chucks 38. By means of this accessory, a selected one of them may be used to provide the support connection between the arbor and chuck.

Figure 5:
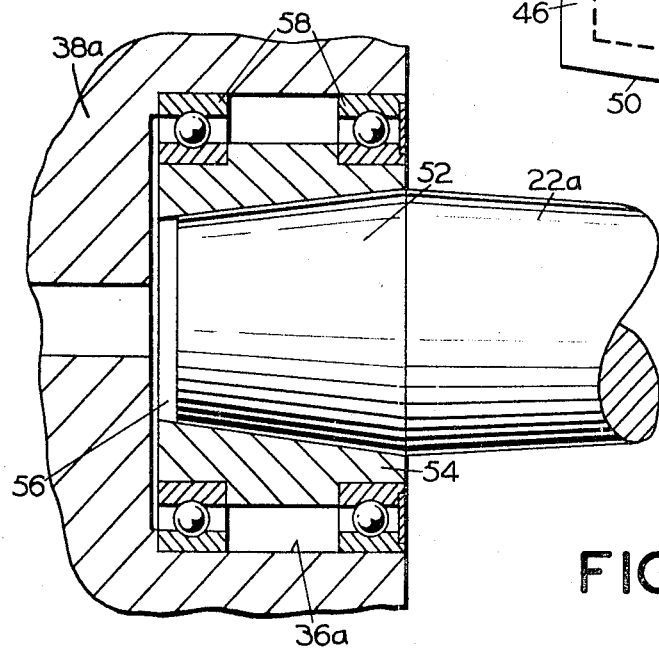
FIGS. 5 and 6 are fragmentary sectional views similar to FIG. 2 but showing additional embodiments.

FIG. 5 shows a further form of the invention wherein an arbor 22a has a tapered front end portion 52 on which is frictionally engaged a head 54, such head having a forwardly and inwardly tapered bore 56 for receiving said tapered portion 52 of the arbor. In this embodiment, the outer surface of the head 54 is of uniform diameter and supports a pair of ball bearing members 58 which are mounted in a parallel walled, rearwardly opening recess 36a of a chuck 38a. These bearings provide a live head connection between the arbor 22a and the chuck 38a, whereby all the advantages enumerated in connection with the embodiment of FIG. 2 are present in the FIG. 5 embodiment.

Figure 6:
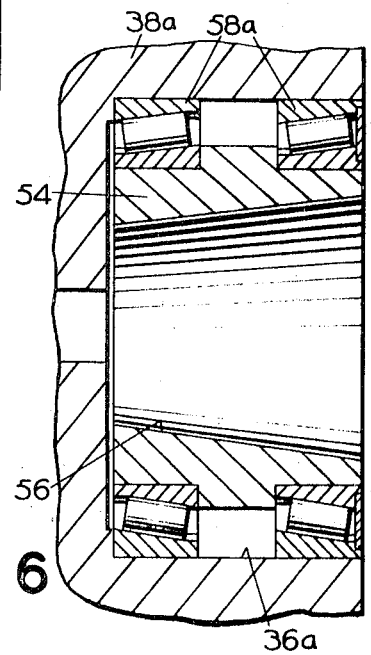

The embodiment of FIG. 6 is identical to that of FIG. 5 except that roller bearings 58a are employed instead of ball bearings.

It is to be understood that the form of my invention herein shown and described is to be taken as a preferred example of the same and that various changes in the shape, size and arrangement of parts may be resorted to without departing from the spirit of my invention. For example, the concept herein is illustrated in conjunction with lathes, but it is to be understood that it may be used with other types of machines such as shapers, milling machines or others that use dead centers.

Having thus described my invention, I claim:

1. A live center arbor and work engaging member assembly for supporting a workpiece on a tailstock of a machine, comprising
   a. an arbor having a body member with forward and rearward portions;
   b. the rearward portion of said body member being arranged to be mounted in the tailstock;
   c. a projection on the forward portion of said arbor;
   d. an adapter having a supported engagement on said projection;
   e. a work engaging member having a supported engagement on said adapter and having a rearward end portion provided with a recess;

f. said recess being of a shape corresponding to the outer shape of said adapter for receiving the latter;

g. and means on said adapter arranged to provide a rotatable connection between the work engaging member and said arbor;

h. one of the supported engagements of said adapter on said projection and said work engaging member on said adapter comprising a quick detachable supported engagement for substituting one work engaging member for another.

2. The arbor construction of claim 1 wherein said adapter has an outer tapered configuration and said recess in said work engaging member is correspondingly tapered to provide a friction engagement as said quick detachable supported engagement.

3. The arbor construction of claim 1 wherein said means arranged to provide a rotatable connection between the work engaging member and the arbor comprises bearing means disposed between said adapter and said arbor.

4. The arbor construction of claim 1 wherein said means arranged to provide a rotatable connection between said work engaging member and said arbor comprises bearing means disposed between said adapter and the work engaging member.

5. The arbor construction of claim 1 wherein said head has an outer tapered configuration and said recess in said work engaging member is correspondingly tapered to provide the detachable frictional support.

6. The arbor construction of claim 1 wherein said adapter has a bore for fitting on said projection, said means which are arranged to provide a rotatable connection between said work engaging member and said body member comprising bearing means disposed between said adapter and said work engaging member.

7. The arbor construction of claim 1 wherein the forward portion of said body member is tapered and said bore in the adapter is correspondingly tapered for receiving the forward portion of said body member.

8. The arbor construction of claim 1 including an auxiliary adapter having socket means for receiving a forward portion of said body member and having an outer surface arranged to be received in said recess of said work engaging member, whereby work engaging members having different sizes of recess may be mounted on said arbor by providing an auxiliary adapter of an outer surface size corresponding to the size of the recess in said work engaging member.

* * * * *